May 4, 1926.
H. LANDMAN
ICE CREAM DIPPER MOLD
Filed May 18, 1925
1,583,072
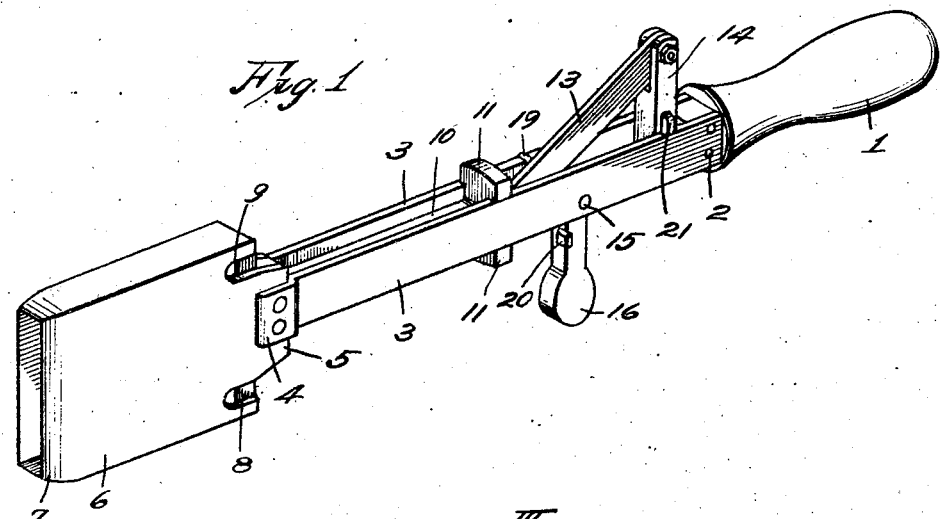
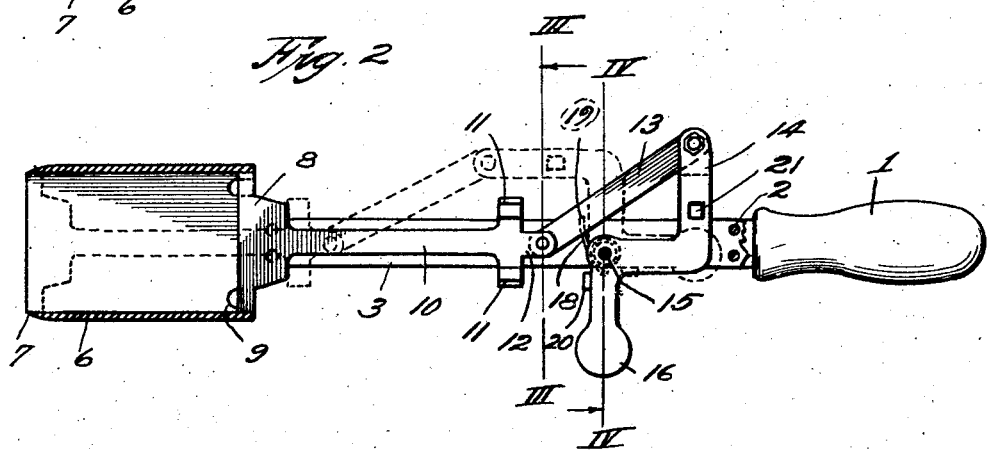
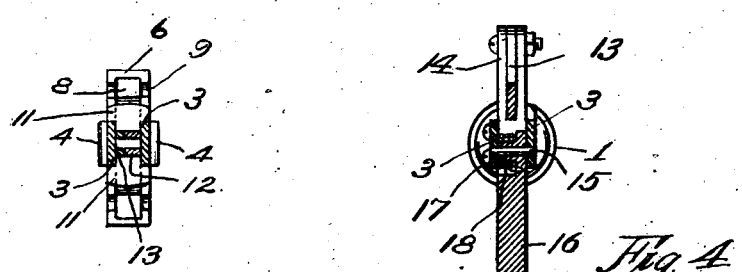
Witness:
R. E. Hamilton
Inventor,
Herman Landman
By Thorpe Gerard
Atty's Patented May 4, 1926.

1,583,072

UNITED STATES PATENT OFFICE.

HERMAN LANDMAN, OF KANSAS CITY, MISSOURI.

ICE-CREAM DIPPER MOLD.

Application filed May 18, 1925. Serial No. 30,995.

*To all whom it may concern:*

Be it known that I, HERMAN LANDMAN, a citizen of the United States, and a resident of Kansas City, county of Jackson, State of Missouri, have invented a certain new and useful Improvement in Ice-Cream Dipper Molds, of which the following is a complete specification.

This invention relates to ice cream dipper molds and has for its object to produce a mold for the production of slabs or slices of ice cream from a freezer, for serving on a plate or between cakes or crackers as a so-called ice cream sandwich, and my special object is to produce a device of this character which is thoroughly sanitary in that no part of the device which comes in contact with the ice cream, can deleteriously affect the same.

A further object is to produce a device in which the operable parts can be quickly and easily removed to facilitate the thorough and quick cleansing of all of the parts.

A still further object is to produce a mold of the character described which is of simple, compact, strong, durable and inexpensive construction; and in order that it may be fully understood, reference is to be had to the accompanying drawing, in which:—

Figure 1 is a perspective view of a mold embodying the invention.

Figure 2 is a central vertical longitudinal section taken through a part of the mold to show the operative parts thereof Figure 3 is a section on the line III—III of Figure 2.

Figure 4 is a section on the line IV—IV of Figure 2.

In the said drawing, where like reference characters identify corresponding parts in all of the figures, 1 indicates a suitable handle, to one end of which is detachably secured by means of screws 2, a pair of parallel side arms 3, which are offset outwardly at their ends as at 4 and are attached to side extension portions 5 formed on one end of a rectangular shaped thin-walled metallic mold 6, which when thrust into and withdrawn from a body of ice cream, cuts a slab or slice and detaches it therefrom, the mold being formed with bevelled cutting edges 7 for better and easier entry into the mass of frozen cream.

For reciprocation within the rectangular mold, there is a plunger 8 having a flat face equal in area to the interior cross sectional area of the mold, the plunger normally standing at the rear end of the mold. When the mold is forced into the cream, the latter enters the mold until stopped by contact with the face of the plunger, the entrapped air escaping through suitable apertures 9, the embodiment disclosed in the drawing locating such apertures in the sides of the mold.

In order to provide convenient means for the operation of the plunger with one hand, it is provided with an operating stem 10, lying between arms 3, and formed at its rear end with an I-shaped cross-head or guide 11, having sliding engagement with the said arms.

Projecting rearwardly from the cross-head 11 is an ear 12 pivotally engaged with one end of a link 13. The opposite end of the link 13 is pivoted in the bifurcated end of an angle-lever 14, which fixedly carries a pivot pin 15 journaled in suitable openings in and bridging the space between the parallel arms 3, the free end of said lever being formed with an operating head or handle 16. The lever where engaged with the pin 15, is formed with a hub 17, and wound around said hub is a coiled spring 18, formed at one end with a hook 19 engaging one of the parallel arms 3, the opposite end of the spring being inserted within a socket formed in the handle portion 16 (see Figure 4). The spring is positioned so as to normally maintain the plunger in its retracted position during the charging of the mold with cream. The position of retraction of the plunger is limited by a stop lug 21 projecting laterally from the lever 14 (see Figure 2), for engagement with one of the arms 3. When the handle 16 is operated by the thumb or finger of the operator to the dotted line position shown in Figure 2, the plunger is advanced to its dotted line position shown in the same figure and is stopped by the contact of a second stop 20 on the handle 16 with one of the arms 3. This movement effects the complete ejection of a slab of ice cream conforming to the shape of the mold, which slab may be served on a plate or between cakes or crackers in the form of an ice cream sandwich.

It is to be understood in the above connection, that a mold constructed in accordance with the invention is very sanitary and may be quickly and easily dismantled for sterilization or cleaning. When it is desired to dismantle it for cleaning, the spring 18 is unhooked from the arm 3. The screws 2 are then withdrawn, thus permitting the removal of the handle 1. The arms 3 possess sufficient resiliency to permit them to be spread apart sufficiently to disengage the pin 15 from the arms 3. As soon as said pin has been disengaged, all of the operative parts may be withdrawn from their positions between the arms 3. The reassembling of the parts can be effected with equal facility.

From the above description, it will be apparent that I have produced a device of the character described which possesses all the features of advantage set forth as desirable; and while I have described and claimed the preferred embodiment of the same, I reserve the right to make all changes properly falling within the spirit and scope of the appended claims.

I claim:

1. The combination in a device for cutting slabs from a mass of ice cream and ejecting such slabs, of a pair of cooperating elements, one comprising a hollow head open at both ends, and provided with arms extending rearwardly from the opposite sides of the head and equipped at their rear ends with a handle, and the other comprising a plunger fitting in the hollow head; said elements providing an opening for the escape of air from the head when the plunger is at the rear end of the head, guiding means for the plunger, fitting slidingly on said arms, a manually-operable angle lever between the arms, a pin secured to the lever and detachably pivoted to said arms, and a link pivotally connected at its end to transmit power between the lever and the plunger to cause the operation of one to effect the operation of the other.

2. An ice cream mold, comprising a hollow head of substantially oblong-rectangular form in cross section, a pair of parallel arms extending from opposite sides of the head at the rear end of the latter, a handle removably secured to the rear ends of the said arms, a plunger fitting slidingly in the said head and provided with a stem, a crosshead rigid on the stem and fitting slidingly between and on said arms, a lever detachably pivoted to and lying between the said arms, a link pivotally connecting one end of the lever with the rear end of the plunger stem, and a spring coiled around the axis of the lever and attached at one end to one of the parallel arms and exerting pressure on the lever to hold the plunger normally retracted.

In witness whereof I hereunto affix my signature.

HERMAN LANDMAN.